(12) United States Patent
Imanishi et al.

(10) Patent No.: US 8,460,835 B2
(45) Date of Patent: Jun. 11, 2013

(54) FUEL CELL SYSTEM

(75) Inventors: Hiroyuki Imanishi, Toyota (JP); Kota Manabe, Toyota (JP); Tomoya Ogawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 494 days.

(21) Appl. No.: 12/675,709

(22) PCT Filed: Aug. 22, 2008

(86) PCT No.: PCT/JP2008/065478
§ 371 (c)(1),
(2), (4) Date: Jul. 23, 2010

(87) PCT Pub. No.: WO2009/028637
PCT Pub. Date: Mar. 5, 2009

(65) Prior Publication Data
US 2010/0291452 A1 Nov. 18, 2010

(30) Foreign Application Priority Data
Aug. 28, 2007 (JP) ................................. 2007-221336

(51) Int. Cl.
*H01M 8/04* (2006.01)
(52) U.S. Cl.
USPC ............ 429/432; 429/430; 429/433; 429/434
(58) Field of Classification Search
USPC .................... 429/430, 432, 433, 434
See application file for complete search history.

(56) References Cited

U.S. PATENT DOCUMENTS 8,288,050 B2 * 10/2012 Manabe et al. ............... 429/443
2004/0228055 A1 * 11/2004 Pearson ...................... 361/93.1

FOREIGN PATENT DOCUMENTS

| JP | 63-110558 A | 5/1988 |
|---|---|---|
| JP | 2002-313388 A | 10/2002 |
| JP | 2004-030979 A | 1/2004 |
| JP | 2005-030948 A | 2/2005 |
| JP | 2005-197030 A | 7/2005 |
| JP | 2005-332702 A | 12/2005 |
| JP | 2006-114487 A | 4/2006 |
| JP | 2007-184243 A | 7/2007 |
| WO | WO 2007063783 A1 * | 6/2007 |

* cited by examiner

*Primary Examiner* — Carlos Barcena
(74) *Attorney, Agent, or Firm* — Kenyon & Kenyon LLP

(57) ABSTRACT

A fuel cell system increases an output voltage of a fuel cell if an electric power generation command value Pref for the fuel cell abruptly reduces while the fuel cell is being warmed up at a low-efficiency operation, which has lower electric power generation efficiency than that of a normal operation. Thus, the surplus electric power Ws corresponding to the difference between an electric power generation amount Pmes of the fuel cell and the electric power generation command value Pref is stored into a capacitive component of the fuel cell, thereby matching the electric power supplied to an external load of the fuel cell (Pmes-Ws) with the electric power generation command value Pref. This makes it possible to conduct control not to supply the surplus electric power to the external load when the electric power required from the fuel cell suddenly reduces during the low-efficiency operation.

7 Claims, 9 Drawing Sheets

FUEL CELL SYSTEM

This is a 371 national phase application of PCT/JP2008/065478 filed 22 Aug. 2008, which claims priority to Japanese Patent Application No. 2007-221336 filed 28 Aug. 2007, the contents of which are incorporated herein by reference.

TECHNICAL FIELD

The present invention relates to a fuel cell system adapted to warm up a fuel cell by low-efficiency operation.

BACKGROUND ART

A fuel cell is an electric power generating system which oxidizes a fuel by an electrochemical process to directly convert the energy emitted due to an oxidation reaction into electrical energy, and which has a stack structure constituted of a plurality of layered membrane electrode assemblies formed by sandwiching both side surfaces of an electrolyte membrane for selectively transporting hydrogen ions by a pair of electrodes composed of a porous material. In particular, a solid polyelectrolyte fuel cell using a solid polymer membrane as an electrolyte is expected to find application as a vehicle-mounted electric power source because of its low cost, ease of size reduction, and high output density.

For this type of fuel cells, it is generally known that the range of 70 to 80° C. is an optimum temperature range for electric power generation. In an environment of a cold region or the like, there are cases where a prolonged time is required for the optimum temperature range to be reached after a startup, so that various types of warm-up systems are being studied. For example, Japanese Patent Application Laid-Open No. 2002-313388 discloses a technique for warming up a fuel cell while a vehicle is traveling by controlling the amount of self-heating of the fuel cell by carrying out a low-efficiency operation in which electric power generation efficiency is lower than that of a normal operation. According to the technique, an output voltage of the fuel cell is set to have a voltage value that is lower than a voltage value based on its I-V characteristic (current-to-voltage characteristic) to carry out a warm-up operation from self-heating by increasing a heat loss of the fuel cell. This obviates the need for mounting a warm-up apparatus, providing enhanced convenience.

[Patent Document 1] Japanese Patent Application Laid-Open No. 2002-313388

DISCLOSURE OF INVENTION

In the meanwhile, for the low-efficiency operation performed while a vehicle is traveling, it is ideal to variably control the flow rate of an oxidizing gas supplied to a fuel cell according to required electric power, the output voltage of the fuel cell being fixed to a given voltage value, which is lower than a voltage value based on the I-V characteristic thereof. The output voltage of the fuel cell at this time is set to a given voltage value which makes it possible to implement a prompt warm-up operation and to obtain a minimum motor output required for the vehicle to travel. Here, the reason for fixing the output voltage of the fuel cell to a given voltage value is because, in the case where operation control is conducted with the output voltage of the fuel cell set to a voltage that is lower than a voltage based on the I-V characteristic thereof to lower the electric power generation efficiency during a warm-up operation, a change (an increase or decrease) in the output voltage of the fuel cell would inconveniently cause electric power to be stored or released in or from a capacitive component, which is parasitically formed in the fuel cell, resulting in an excess or deficiency of electric power supplied from the fuel cell to an external load (a traction motor, a vehicle-mounted auxiliary device, or the like).

Meanwhile, according to the technique disclosed in Japanese Patent Application Laid-Open No. 2002-313388, the output of the fuel cell is undesirably reduced in compensation for lowering the electric power generation efficiency of the fuel cell at the time of the warm-up operation, making it impossible to carry out output control based on required electric power. To solve the problem, the flow rate of an oxidizing gas supplied to the fuel cell may be variably controlled according to required electric power while fixing the output voltage of the fuel cell to a given voltage value which is lower than a voltage value based on the I-V characteristic thereof during the low-efficiency operation while the vehicle is traveling.

However, in some fuel cell hybrid vehicles using fuel cell systems as the vehicle-mounted electric power sources thereof, oxidizing gases are supplied to fuel cells by air compressors. Drive motors with excellent responsiveness are installed in the air compressors, so that the air compressors exhibit good responsiveness in a case where the opening degree of an accelerator pedal is abruptly increased. However, many air compressors are not provided with speed reducers, such as brakes, thus exhibiting poor responsiveness to an abrupt decrease in the opening degree of the accelerator pedal. In fact, therefore, a reduction in the number of revolutions due to inertia is waited for.

Accordingly, even if the opening degree of the accelerator pedal is suddenly decreased during the low-efficiency operation while the vehicle is traveling, the flow rate of the oxidizing gas to the fuel cell cannot be suddenly decreased, inconveniently resulting in the generation of surplus electric power exceeding an electric power generation command value. Although the surplus electric power is stored into a battery, the battery may be overcharged in the case where the charge capability of the battery has been deteriorated in a low-temperature environment.

An object of the present invention is, therefore, to propose a fuel cell system capable of conducting control such that no surplus electric power is supplied to an external load if electric power required from a fuel cell is suddenly reduced during a low-efficiency operation.

To this end, a fuel cell system in accordance with the present invention comprises: a fuel cell which receives the supply of a reactant gas to generate electric power; a warm-up device which warms up the fuel cell by a low-efficiency operation having lower power generation efficiency than that of a normal operation; and a controller which increases an output voltage of the fuel cell when an electric power generation command value for the fuel cell abruptly reduces in the midst of the low-efficiency operation, thereby storing surplus electric power exceeding the electric power generation command value into a capacitive component of the fuel cell.

With this arrangement, surplus electric power exceeding the electric power generation command value can be stored into the capacitive component of the fuel cell when the electric power generation command value suddenly reduces during the low-efficiency operation, thus making it possible to restrain the supply of surplus electric power to an external load from the fuel cell.

Here, the capacitive component of the fuel cell means an apparent capacitive component attributable to the oxidation-reduction reaction between an electrical double layer capacitive component and a catalyst of a catalyst carrier of the fuel cell. Further, the low-efficiency operation means to operate a battery at an operating point having a voltage value which is lower than a voltage value determined by a current-to-voltage characteristic curve of the fuel cell.

The fuel cell system in accordance with the present invention may further comprise map data indicating capacitance values relative to voltages of the capacitive component; and a correcting device which corrects the aforesaid map data on the basis of an actually measured value of the aforesaid capacitive component obtained by dividing an output current of the fuel cell by a change per unit time of an output voltage of the fuel cell.

A capacitive component of a fuel cell is known to deteriorate with the elapse of time by catalytic oxidation or the like after use over a prolonged time. Surplus electric power can be accurately stored into the capacitive component by correcting the map data indicating capacitance values relative to voltages of the capacitive component on the basis of actually measured values of the capacitive component.

The fuel cell system in accordance with the present invention may further comprise an electric power generation command device which gently reduces an electric power generation command value such that a difference between the amount of generated power of the fuel cell and the electric power generation command value is controlled in the case where an operating load on the fuel cell is suddenly decreased in the midst of the low-efficiency operation.

Surplus electric power can be minimized and the difference between the amount of generated power supplied to an external load of the fuel cell and an electric power generation command value can be reduced by gently decreasing the electric power generation command value such that the difference between the amount of generated power of the fuel cell and an electric power generation command value is controlled.

In the case where an operating point specified to store surplus electric power into the capacitive component has a voltage value which is higher than a voltage value determined by the current-to-voltage characteristic curve of the fuel cell in the normal operation, it means that the operating point is out of a low-efficiency operation range. Therefore, the controller preferably switches an operation mode from the low-efficiency operation to the normal operation.

Preferably, the controller forcibly generates surplus electric power by supplying more reactant gas than a reactant gas supply amount which matches an electric power generation command value to the fuel cell when switching from the low-efficiency operation to the normal operation, and increases an output voltage of the fuel cell so as to store the surplus electric power into the capacitive component.

Changing the low-efficiency operation over to the normal operation requires the operating point of the fuel cell be moved to an operating point determined by the current-to-voltage characteristic curve from the low-efficiency operation range (the voltage value of the operating point be increased). At this time, forcibly generating surplus electric power by oversupplying the reactant gas to the fuel cell and increasing the output voltage of the fuel cell to store the surplus electric power into the capacitive component make it possible to switch the operation mode from the low-efficiency operation to the normal operation without causing a change in the electric power supplied to an external load of the fuel cell.

BEST MODE FOR CARRYING OUT THE INVENTION

The following will describe an embodiment in accordance with the present invention with reference to the accompanying drawings.

Figure 1:
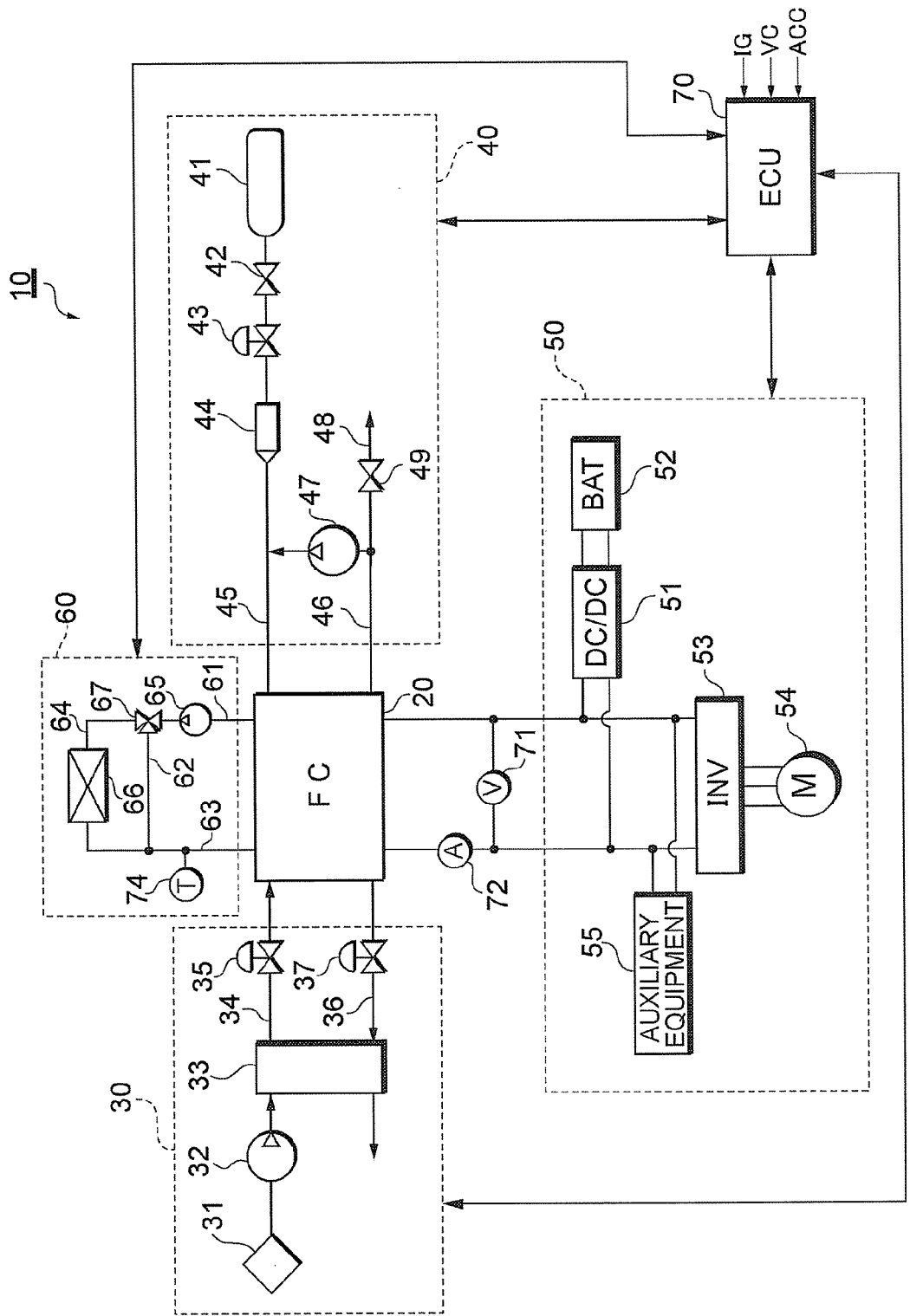
FIG. 1 is a system block diagram of a fuel cell system in accordance with a present embodiment.

FIG. 1 is a system configuration of a fuel cell system 10 according to the present embodiment.

The fuel cell system 10 functions as a vehicle-mounted electric power source system installed in a fuel cell hybrid vehicle, and includes a fuel cell stack 20 which receives the supply of a reactant gas (a fuel gas and an oxidizing gas) to generate electric power, an oxidizing gas supply system 30 for supplying air as the oxidizing gas to the fuel cell stack 20, a fuel gas supply system 40 for supplying a hydrogen gas as the fuel gas to the fuel cell stack 20, an electric power system 50 for controlling the charge/discharge of electric power, a cooling system 60 for cooling the fuel cell stack 20, and a controller (ECU) 70 which controls the entire system.

The fuel cell stack 20 is a solid polymer electrolytic cell stack composed of a plurality of cells layered in series. In the fuel cell stack 20, an oxidation reaction represented by expression (1) takes place at an anode electrode, while a reduction reaction represented by expression (2) takes place at a cathode electrode. An electromotive reaction represented by expression (3) takes place in the entire fuel cell stack 20.

$$H_2 \rightarrow 2H^+ + 2e^- \tag{1}$$

$$(½)O_2 + 2H^+ + 2e^- \rightarrow H_2O \tag{2}$$

$$H_2 + (½)O_2 \rightarrow H_2O \tag{3}$$

A voltage sensor 71 for detecting an output voltage of the fuel cell stack 20 and a current sensor 72 for detecting an electric power generation current are attached to the fuel cell stack 20.

The oxidizing gas supply system 30 has an oxidizing gas flow path 34 through which an oxidizing gas to be supplied to the cathode electrode of the fuel cell stack 20 passes, and an oxidizing off gas flow path 36 through which an oxidizing off gas discharged from the fuel cell stack 20 passes. The oxidizing gas flow path 34 is provided with an air compressor 32 which takes in an oxidizing gas from the atmosphere through a filter 31, a humidifier 33 for humidifying the oxidizing gas to be supplied to the cathode electrode of the fuel cell stack 20, and a throttle valve 35 for adjusting an oxidizing gas supply amount. The oxidizing off gas flow path 36 is provided with a backpressure adjusting valve 37 for adjusting an oxidizing gas supply pressure and the humidifier 33 for exchanging moisture between the oxidizing gas (a dry gas) and the oxidizing off gas (a wet gas).

The fuel gas supply system 40 has a fuel gas supply source 41, a fuel gas flow path 45 through which the fuel gas to be supplied to the anode electrode of the fuel cell stack 20 from the fuel gas supply source 41 passes, a circulating flow path 46 for returning the fuel off gas discharged from the fuel cell stack 20 to the fuel gas flow path 45, a circulating pump 47 for pressure-feeding the fuel off gas in the circulating flow path 46 to the fuel gas flow path 45, and an exhaust/drainage flow path 48 branched and connected to the circulating flow path 46.

The fuel gas supply source 41 is constituted of, for example, a high-pressure hydrogen tank, a hydrogen storing alloy or the like, and stores a hydrogen gas of a high pressure (e.g., 35 MPa to 70 MPa). When a shutoff valve 42 is opened, the fuel gas flows out of the fuel gas supply source 41 into the fuel gas flow path 45. The pressure of the fuel gas is decreased to, for example, approximately 200 kPa by a regulator 43 or an injector 44 before the fuel gas is supplied to the fuel cell stack 20.

The fuel gas supply source 41 may alternatively be constituted of a reformer which generates a hydrogen-rich reformed gas from a hydrocarbon-based fuel and a high-pressure gas tank which places the reformed gas, which has been generated using the reformer, in a high pressure state and accumulates the high-pressure reformed gas.

The regulator 43 is a device which adjusts the pressure on the upstream side thereof (a primary pressure) to a preset secondary pressure and constituted of, for example, a mechanical pressure reducing valve which reduces the primary pressure. The mechanical pressure reducing valve has an enclosure in which a backpressure chamber and a pressure governing chamber are formed with a diaphragm being provided therebetween. The primary pressure is reduced to a predetermined pressure in the pressure governing chamber by a backpressure in the backpressure chamber, thereby producing the secondary pressure.

The injector 44 is an electromagnetically driven on-off valve capable of adjusting a gas flow rate or a gas pressure by directly driving a valve body by an electromagnetic driving force at a predetermined driving cycle to move the valve body away from a valve seat. The injector 44 is provided with a valve seat having an injection orifice through which a gaseous fuel, such as a fuel gas, is injected, a nozzle body which guides the gaseous fuel to an injection orifice, and the valve body which is movably accommodated and held in an axial direction (a direction in which the gas flows) relative to the nozzle body and which opens/closes the injection orifice.

The exhaust/drainage flow path 48 has an exhaust/drainage valve 49. The exhaust/drainage valve 49 is actuated by a command from the controller 70 to discharge a fuel off gas containing an impurity and moisture from the circulating flow path 46 to the outside. Opening the exhaust/drainage valve 49 reduces the concentration of the impurity in the fuel off gas in the circulating flow path 46, thus making it possible to increase the concentration of the hydrogen in the fuel off gas circulating in the circulating system.

The fuel off gas discharged through the exhaust/drainage valve 49 is mixed with an oxidizing off gas flowing through the oxidizing off gas flow path 34 and then diluted using a diluter (not shown). The circulating pump 47 circularly supplies the fuel off gas in the circulating system to the fuel cell stack 20 by driving a motor.

The electric power system 50 includes a DC/DC converter 51, a battery 52, a traction inverter 53, a traction motor 54, and auxiliary equipment 55. The DC/DC converter 51 has a function for increasing a DC voltage supplied from the battery 52 and outputs the increased DC voltage to the traction inverter 53 and a function for decreasing the voltage of DC electric power generated by the fuel cell stack 20 or regenerative electric power collected by the traction motor 54 by regenerative braking and then for storing the DC electric power or the regenerative electric power with a decreased voltage into the battery 52. These functions of the DC/DC converter 51 control the charge/discharge of the battery 52. Further, the operating point (the output voltage and the output current) of the fuel cell stack 20 is controlled by the voltage conversion control carried out by the DC/DC converter 51.

The battery 52 functions as a storage source of surplus electric power, a regenerative energy storage source at the time of regenerative braking, and an energy buffer at the time of a load change caused by acceleration or deceleration of the fuel cell hybrid vehicle. The battery 52 ideally uses a secondary battery such as, for example, a nickel-cadmium battery, a nickel hydride battery, or a lithium secondary battery.

The traction inverter 53 is, for example, a PWM inverter driven by a pulse width modulation method, and the traction inverter 53 converts a DC voltage output from the fuel cell stack 20 or the battery 52 into a three-phase AC voltage and controls the rotary torque of the traction motor 54 according to a control command from the controller 70. The traction motor 54 is, for example, a three-phase AC motor, and constitutes a motive power source of the fuel cell hybrid vehicle.

The auxiliary equipment 55 generically refers to motors (e.g., motive power sources, such as pumps or the like) disposed at individual sections in the fuel cell system 10 or inverters or the like for driving the motors, or further refers to various vehicle-mounted auxiliary equipment (e.g., an air compressor, an injector, a cooling water circulating pump, a radiator, and the like).

The cooling system 60 is provided with a coolant flow paths 61, 62, 63 and 64 for passing a coolant, which circulates inside the fuel cell stack 20, therethrough, a circulating pump 65 for pressure-feeding the coolant, a radiator 66 for the heat exchange between the coolant and external air, a three-way valve 67 for switching the circulating paths of the coolant, and a temperature sensor 74 for detecting the temperature of the coolant. In the normal operation after the completion of the warm-up operation, the opening/closing of the three-way valve 67 is controlled such that the coolant flowing out of the fuel cell stack 20 passes through the coolant flow paths 61 and 64 to be cooled by the radiator 66, then flows back through the coolant flow path 63 into the fuel cell stack 20. Meanwhile, in the warm-up operation immediately after the system is started up, the opening/closing of the three-way valve 67 is controlled such that the coolant flowing out of the fuel cell stack 20 passes through the coolant flow paths 61, 62, and 63 and runs back into the fuel cell stack 20.

The controller 70 is a computer system having a CPU, a ROM, a RAM, I/O interface and the like, and functions as a control unit for controlling the individual sections (the oxidizing gas supply system 30, the fuel gas supply system 40, the electric power system 50, and the cooling system 60) of the fuel cell system 10. For example, upon receipt of a startup signal IG output from an ignition switch, the controller 70 starts the operation of the fuel cell system 10 and determines the required electric power for the entire system on the basis of mainly an accelerator pedal opening degree signal ACC output from an accelerator pedal sensor and a vehicle speed signal VC output from a vehicle speed sensor.

The required electric power for the entire system is the total value of the electric power for vehicle travel and the electric power for auxiliary equipment. The electric power for the auxiliary equipment mainly includes the electric power consumed by vehicle-mounted auxiliary equipment (the humidifier, the air compressor, the hydrogen pump, the cooling water circulating pump, and the like), the electric power consumed by devices required for vehicle travel (a transmission, a wheel control unit, a steering device, a suspension device, and the like), and the electric power consumed by devices disposed in a vehicle occupant space (an air conditioning system, lighting fixtures, an audio, and the like).

Further, the controller 70 determines the allocation of the output electric power of the fuel cell stack 20 and the battery 52, respectively, calculates an electric power generation command value, and controls the oxidizing gas supply system 30 and the fuel gas supply system 40 such that the power generation amount of the fuel cell stack 20 matches target electric power. The controller 70 further controls the DC/DC converter 51 to adjust the output voltage of the fuel cell stack 20 thereby to control the operating point (an output voltage and an output current) of the fuel cell stack 20. The controller 70 outputs, for example, AC voltage command values of a U-phase, a V-phase, and a W-phase, respectively, as switching commands to the traction inverter 53 so as to control the output torque and the number of revolutions of the traction motor 54.

Figure 2:
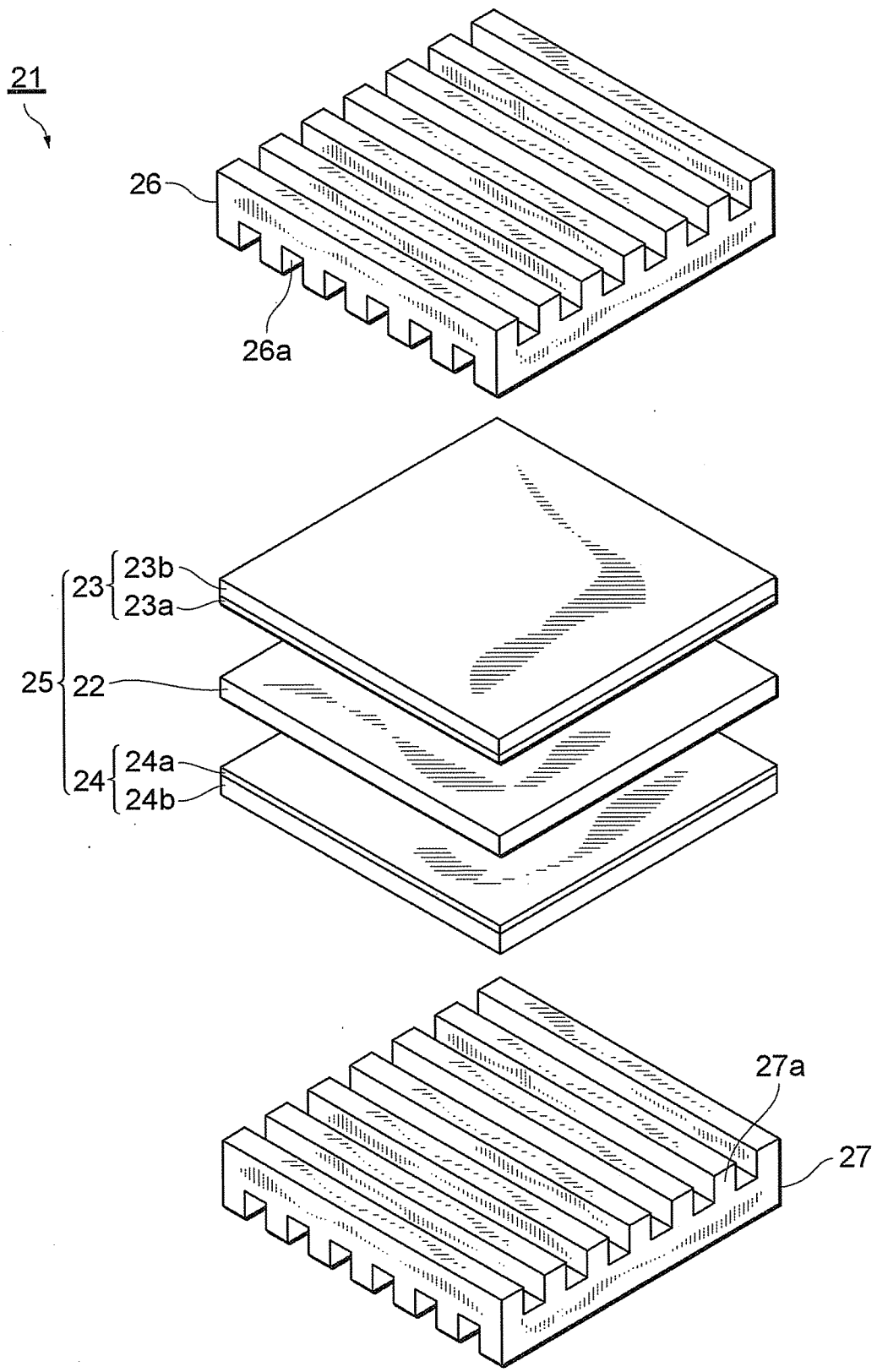
FIG. 2 is an exploded perspective view of a cell.

FIG. 2 is an exploded perspective view of a cell 21 constituting the fuel cell stack 20.

The cell 21 is composed of an electrolyte membrane 22, an anode electrode 23, a cathode electrode 24, and separators 26 and 27. The anode electrode 23 and the cathode electrode 24 form a diffusion electrode sandwiching the electrolyte membrane 22 from both sides. The separators 26 and 27 composed of a gas-impermeable electrically conductive member hold the aforesaid sandwiching structure from both sides, forming a flow path of the fuel gas and a flow path of the oxidizing gas between themselves and the anode electrode 23 and the cathode electrode 24, respectively. The separator 26 has ribs 26a having concave sections formed therein. When the anode electrode 23 abuts against the ribs 26a, the openings of the ribs 26a are closed, forming the fuel gas flow path. The separator 27 has ribs 27a having concave sections formed therein. When the cathode electrode 24 abuts against the ribs 27a, the openings of the ribs 27a are closed, forming the oxidizing gas flow path.

The anode electrode 23 uses, as its major ingredient, a carbon powder carrying a platinum-based metal catalyst (Pt, Pt—Fe, Pt—Cr, Pt—Ni, Pt—Ru, or the like), and has a catalyst layer 23a in contact with the electrolyte membrane 22 and a gas diffusion layer 23b which is formed on the surface of the catalyst layer 23a and has both air permeability and electron conductivity. Similarly, the cathode electrode 24 has a catalyst layer 24a and a gas diffusion layer 24b. More detailedly, the catalyst layers 23a and 24a are formed by dispersing a carbon powder carrying platinum or an alloy composed of platinum and another metal in an appropriate organic solvent, and adding an appropriate amount of an electrolyte solution to turn the mixture into a paste, then depositing the paste on the electrolyte membrane 22 by screen printing. The gas diffusion layers 23b and 24b are formed of a carbon cloth, carbon paper or carbon felt woven using threads consisting of carbon fibers. The electrolyte membrane 22 is a proton-conductive ion-exchange membrane formed of a solid polymer material, such as a fluorinated resin, and displays good electrical conductivity in a wet state. The electrolyte membrane 22, the anode electrode 23, and the cathode electrode 24 constitute a membrane electrode assembly 25.

Figure 3:
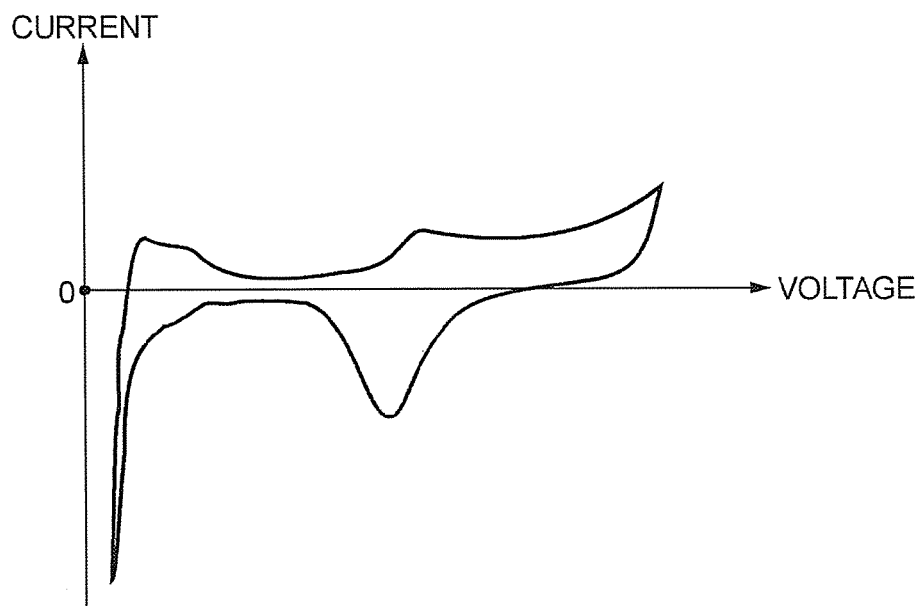
FIG. 3 is a C-V characteristic diagram of a fuel cell stack.

FIG. 3 illustrates a C-V characteristic (cyclic voltanogram) of the fuel cell stack 20.

The C-V characteristic illustrates the dynamic electrical characteristic of the fuel cell stack 20. As the voltage of the fuel cell stack 20 is increased at a certain speed, a current flows in a direction from the outside into the fuel cell stack 20 (the negative direction). As the voltage of the fuel cell stack is decreased at a certain speed, a current flows in a direction from the fuel cell stack 20 to the outside (the positive direction). Such a dynamic electrical characteristic has been found to be caused by an apparent capacitive component attributable to the oxidation-reduction reaction between the electrical double layer capacitive component and a catalyst of a catalyst carrier of the fuel cell stack 20.

Figure 4:
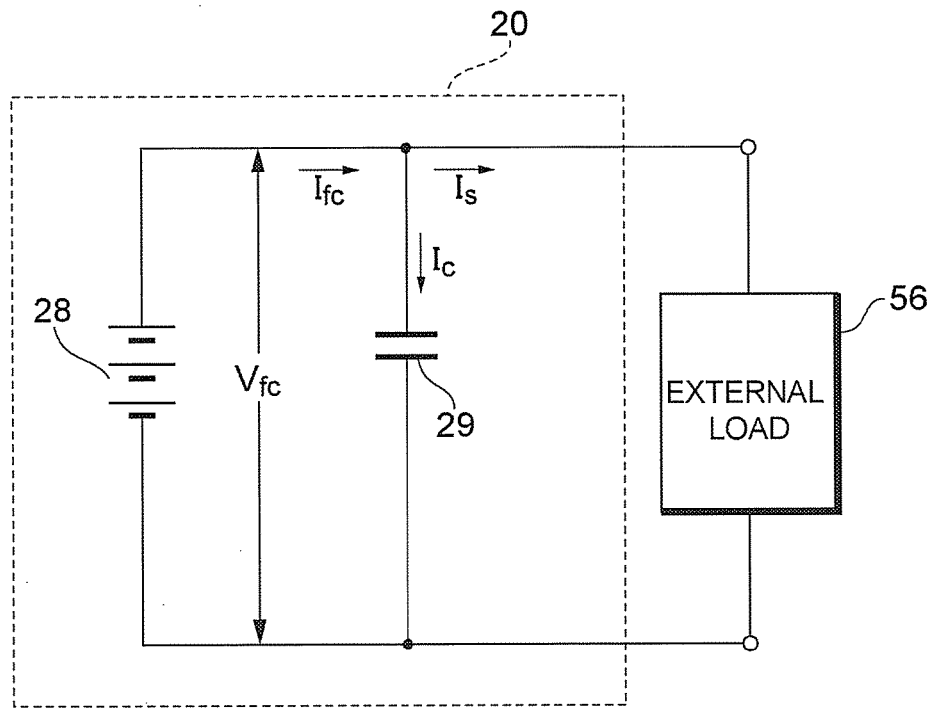
FIG. 4 is an equivalent circuit diagram of a fuel cell stack.

FIG. 4 is an equivalent circuit diagram which models the dynamic electrical characteristic of the fuel cell stack 20.

The fuel cell stack 20 has a circuit configuration in which an ideal fuel cell 28 and a capacitor 29 are connected in parallel. The ideal fuel cell 28 is obtained by modeling a virtual fuel cell which does not have the aforesaid C-V characteristic, and behaves equivalently to a variable power source in terms of electrical characteristic. The capacitor 29 is obtained by modeling, in the form of a capacitive element, the electrical behaviors of the electrical double layer formed on the aforesaid interface. An external load 56 is an equivalent circuit modeling the electric power system 50. If the current flowing out of the ideal fuel cell 28 is denoted by Ifc, the output voltage of the ideal fuel cell 28 (the output voltage of the fuel cell stack 20) is denoted by Vfc, the current flowing into the capacitor 29 is denoted by Ic, the current flowing out of the fuel cell stack 20 into the external load 56 is denoted by Is, the capacitance of the capacitor 29 is denoted by C, and the time is denoted by t, then expressions (4) to (5) given below hold.

$$Ifc = Ic + Is \tag{4}$$

$$Ic = C \cdot \Delta Vfc / \Delta t \tag{5}$$

As indicated by expressions (4) to (5), as the output voltage Vfc is increased, the current Ic flowing into the capacitor 29 increases according to the amount of change per unit time $\Delta Vfc/\Delta t$, so that the current Is flowing out of the fuel cell stack 20 into the external load 56 decreases. Meanwhile, as the output voltage Vfc is decreased, the current Ic flowing into the capacitor 29 decreases according to the amount of change per unit time $\Delta Vfc/\Delta t$, so that the current Is flowing out of the fuel cell stack 20 into the external load 56 increases. Thus, the current Is flowing out of the fuel cell stack 20 into the external load 56 can be increased or decreased by controlling the increasing or decreasing amount of the output voltage Vfc per unit time (hereinafter referred to as "the ΔV control" for the sake of simplicity).

Accordingly to the present embodiment, if the temperature of the stack at the time of a startup of the fuel cell system 10 is below a predetermined temperature (e.g. 0° C.), then a low-efficiency operation is performed while the vehicle is traveling so as to warm up the fuel cell stack 20. The low-efficiency operation means to control the amount of a reactant gas to be supplied to the fuel cell stack 20 with the air stoichiometric ratio being set to approximately 1.0 thereby to increase electric power generation loss and carry out an operation at low electric power generation efficiency. The air stoichiometric ratio refers to an oxygen surplus rate and indicates how much surplus oxygen is supplied in relation to the oxygen required for a reaction with hydrogen without excess or deficiency. Carrying out the low-efficiency operation with the air stoichiometric ratio being set at a low value causes a concentration overvoltage to be higher than that in the normal operation, resulting in an increased heat loss (electric power generation loss) of the energy that can be taken out by the reaction of hydrogen and oxygen. The low-efficiency operation is carried out in a stage of preparation for a startup prior to a vehicle travel or during the warm-up operation while the vehicle is traveling, as a means to, for example, promptly warm up the fuel cell stack 20 by intentionally increasing the heat loss at the time of a startup at a low temperature.

In the low-efficiency operation while the vehicle is traveling, the flow rate of the oxidizing gas to be supplied to the fuel cell stack 20 is variably controlled according to required electric power, the output voltage of the fuel cell stack 20 being fixed at a given voltage value which is lower than a voltage value based on the I-V characteristic thereof. Here, the reason for fixing the output voltage of the fuel cell stack 20 at a given voltage value is because a change in the output voltage of the fuel cell stack 20 inconveniently causes the capacitor 29 to charge or discharge electric power due to the capacitive characteristic of the fuel cell stack 20, as indicated by expressions (4) to (5), leading to excess or deficiency of electric power supplied from the fuel cell stack 20 to the external load 56.

The output voltage of the fuel cell stack 20 in the low-efficiency operation implements a prompt warm-up operation and the output voltage is set to a voltage value that makes it possible to obtain a minimum necessary motor output for the vehicle to travel. From the viewpoint of quick warm-up, the output voltage of the fuel cell stack 20 is desirably set as low as possible; however, if the output voltage is set excessively low, then a motor output required for a vehicle to travel may not be obtained, so that the output voltage is desirably set to a voltage that allows an appropriate motor output for the vehicle travel to be obtained while satisfying warm-up performance, unless an FC output end is provided with a boosting converter.

Thus, the output voltage of the fuel cell stack 20 during the low-efficiency operation is fixed at a given voltage, so that the controller 70 variably controls the amount of the oxidizing gas supplied to the fuel cell stack 20, thereby conducting electric power generation control based on required electric power (the opening degree of the accelerator pedal or the like). For instance, the flow rate of the oxidizing gas to the fuel cell stack 20 is increased at the time of a high load, while the flow rate of the oxidizing gas to the fuel cell stack 20 is decreased at the time of a low load. However, the fuel gas supply to the fuel cell stack 20 is to be maintained at a given flow rate.

The low-efficiency operation is performed until the temperature of the stack rises to a predetermined temperature (e.g., 0° C.) and then switched to the normal operation when the temperature of the stack reaches the predetermined temperature.

Figure 5:
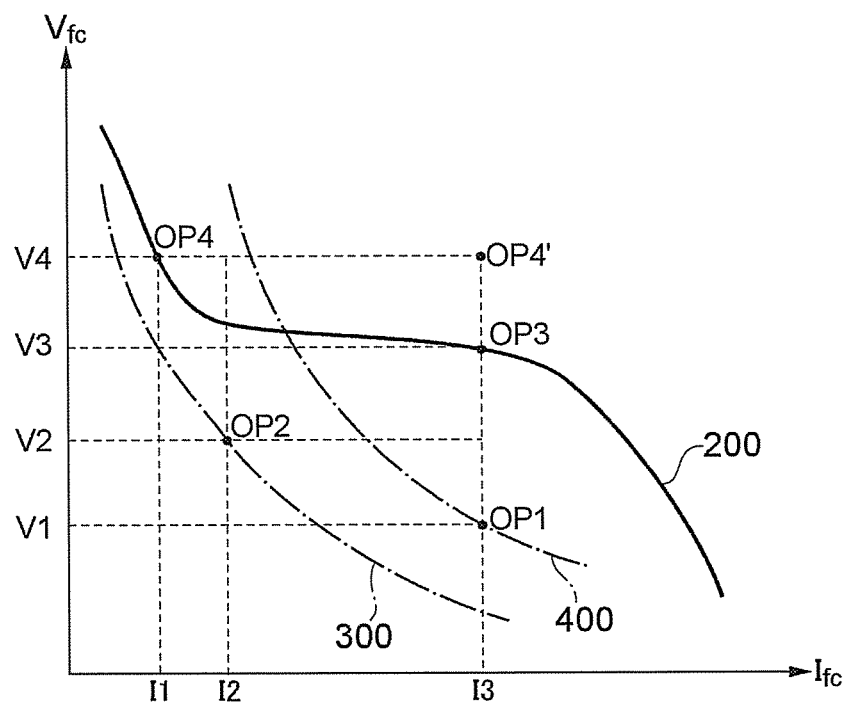
FIG. 5 is a graphical illustration of an operating point of a fuel cell stack.

FIG. 5 illustrates the I-V characteristic of the fuel cell stack 20.

During the normal operation, the operation is controlled such that the operating point (the output current Ifc and the output voltage Vfc) is positioned on an I-V characteristic curve (the current-to-voltage characteristic curve) 200 in order to enhance the power generation efficiency. Meanwhile, during the low-efficiency operation, the power generation efficiency is intentionally lowered to increase the heat loss, so that the operating point is set to a voltage point which is lower than the I-V characteristic curve 200, for example, the output voltage Vfc=V1. In the low-efficiency operation, the output voltage Vfc is fixed to V1, so that the flow rate of air supplied to the fuel cell stack 20 from the air compressor 32 is controlled so as to adjust the output current Ifc, thereby controlling the electric power generation according to an operating load (e.g., the opening degree of the accelerator pedal).

For example, the operating point during a warm-up operation while the vehicle is traveling in the low-efficiency operation mode is denoted by OP1 (I3 and V1). Even if the electric power generation command value for the fuel cell stack 20 is suddenly decreased when the driver turns the accelerator pedal OFF, the air compressor 32 cannot to suddenly decrease the number of revolutions and therefore continues to rotate for a while at a number of revolutions which is larger than a number of revolutions which matches the electric power generation command value. This leads to the occurrence of surplus electric power corresponding to the difference between the amount of generated electric power of the fuel cell stack 20 and the electric power generation command value. The surplus electric power can be stored in the capacitor 29, which parasitically exists in the fuel cell stack 20, by increasing the output voltage Vfc from V1 to V2 (at this time, the operating point moves from OP1 to OP2) by the $\Delta V$ control. This arrangement makes it possible to virtually match the value of the electric power supplied from the fuel cell stack 20 to an external load with the electric power generation command value.

In FIG. 5, reference numerals 300 and 400 respectively denote iso-power lines.

Figure 6:
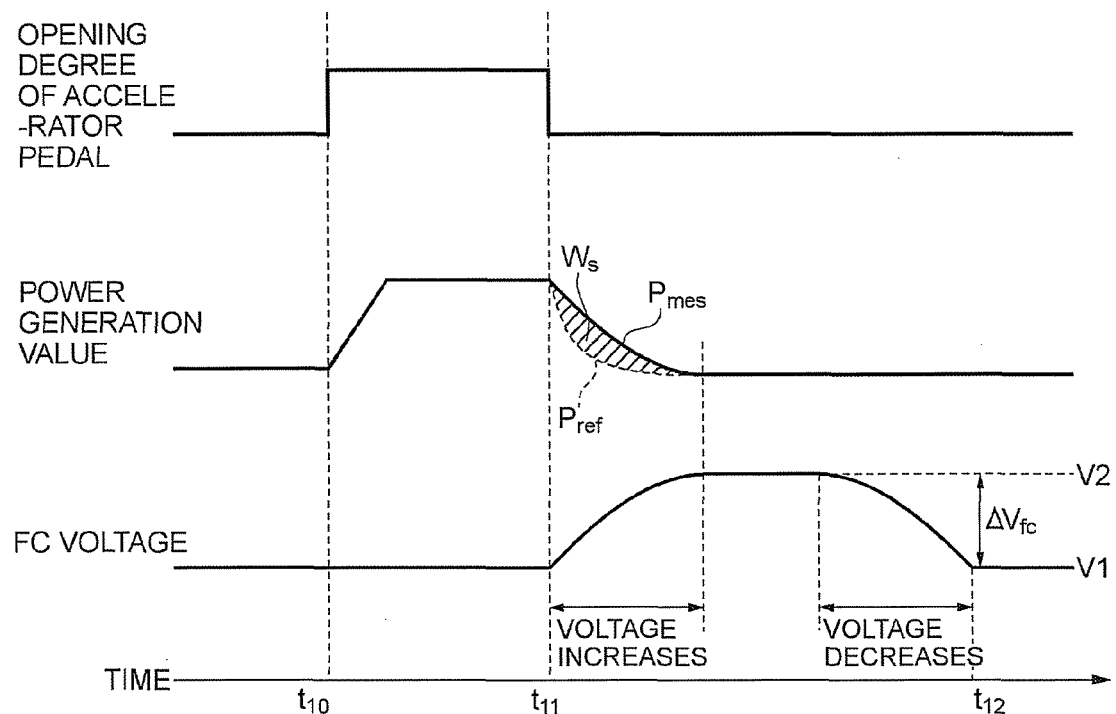
FIG. 6 is a timing chart illustrating a control process of ΔV control.

Here, the $\Delta V$ control will be described in detail with reference to FIG. 5 to FIG. 6.

The $\Delta V$ control will be described by assuming a case, as an example wherein required power to be generated by the fuel cell stack 20 is abruptly reduced, where an accelerator pedal ON state is maintained in the period of time t10 to time t11, and the accelerator pedal is turned OFF at the timing of time t11.

At time t11 when the accelerator pedal is turned OFF, the operating load on the fuel cell stack 20 (specifically, the electric power required for the vehicle to travel) decreases, so that the controller 70 calculates an electric power generation command value Pref such that electric power matching the decreased operating load is generated. At this time, the electric power generation command value Pref gradually decreases, because only electric power to be supplied to vehicle-mounted auxiliary equipment or the like need to be generated. It is assumed that the operating point immediately before time t11 is positioned at OP1 (I3, V1).

However, since the air compressor 32 does not have a speed reducer, such as a brake, it cannot immediately restricts the rotation thereof when the accelerator pedal is turned OFF at time t11 and continues to rotate for a while due to inertia, supplying a larger amount of the oxidizing gas than the supply amount of the oxidizing gas matching the electric power generation command value Pref to the fuel cell stack 20. Therefore, an electric power generation amount Pmes of the fuel cell stack 20 becomes larger than the electric power generation command value Pref, and a difference Ws between these two becomes surplus electric power.

The DC/DC converter 51 increases the output voltage Vfc of the fuel cell stack 20 by $\Delta Vfc=(V2-V1)$ and sets the operating point to OP2 (I2, V2). This causes the surplus electric power Ws to be stored in the capacitive component in the fuel cell stack 20, i.e., the capacitor 29, so that the electric power output to the outside of the fuel cell stack 20 (Pmes−Ws) and the electric power generation command value Pref virtually coincide with each other.

At time t12 when the charge of the surplus electric power Ws in the capacitor 29 is completed, the output voltage Vfc is decreased by $\Delta Vfc=(V2-V1)$, and the operating point is reset from OP2 (I2, V2) back to OP1 (I3, V1).

An operating point OP3 (I3, V3) positioned on the I-V characteristic curve 200 indicates that the maximum voltage which can be theoretically output from the fuel cell stack 20 when the output current is I3 is V3. Even if OP4' (I3, V4) is specified as the operating point for increasing the output voltage Vfc when the $\Delta V$ control is carried out to charge the capacitor 29 with the surplus electric power Ws, the fuel cell stack 20 cannot be operated at the operating point OP4', so that the fuel cell stack 20 will be operated at an operating point OP4 (I1, V4) at which Vfc=V4 on the I-V characteristic curve.

When the $\Delta V$ control moves the operating point to an operating point on the I-V characteristic curve 200, the controller 70 changes the low-efficiency operation over to the normal operation. The judgment condition for the switching from the low-efficiency operation to the normal operation may be a condition in which, for example, the difference between the electric power at the operating point specified as the target point in the $\Delta V$ control and the electric power at an actual operating point after the $\Delta V$ control exceeds a predetermined threshold value. In the example described above, the electric power at the operating point OP4' (I3, V4) specified as the target point in the $\Delta V$ control is $I3\times V4$, and the electric power at the actual operating point OP4 (I1, V4) after the $\Delta V$ control is $I1\times V4$. Hence, the operation mode may be switched from the low-efficiency operation to the normal operation when the difference between the aforesaid two electric powers $(I3-I1)\times V4$ exceeds the predetermined threshold value. The judgment condition corresponds to the function of Min function 910 in FIG. 9, which will be described later.

Figure 7:
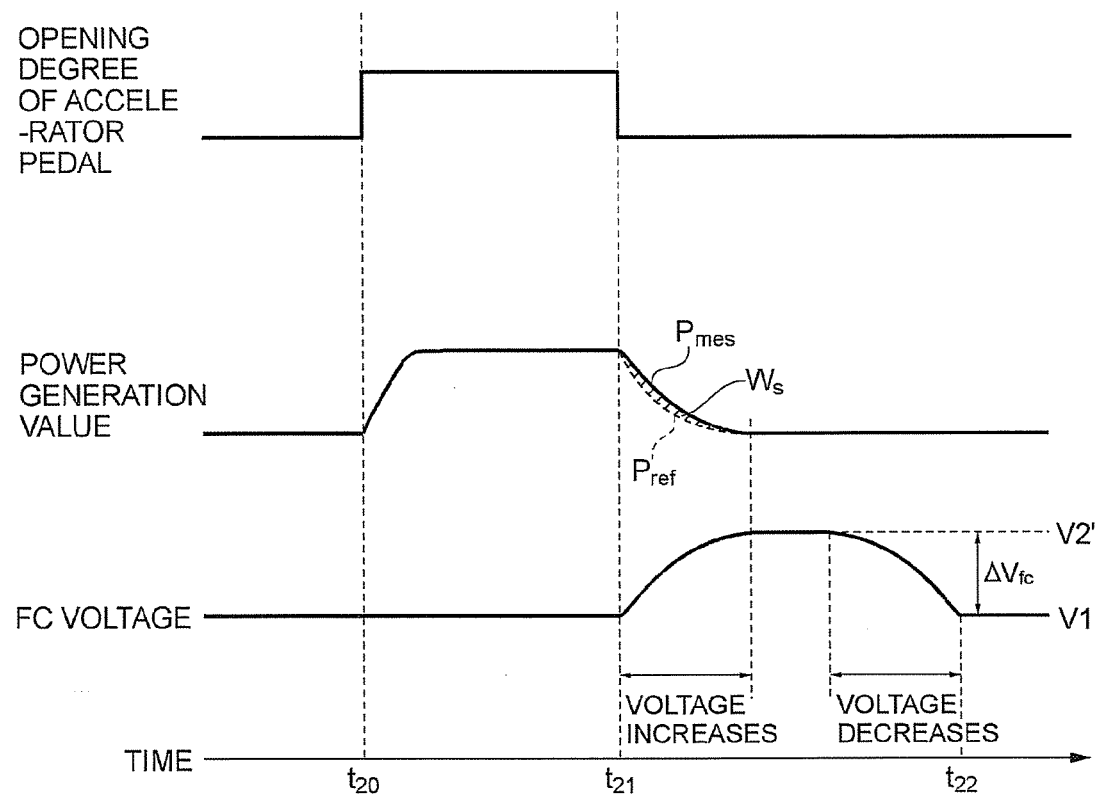
FIG. 7 is a timing chart illustrating a control process of ΔV control.

Referring now to FIG. 7, an application example of the $\Delta V$ control will be described.

As an example in which the electric power required to be generated by the fuel cell stack 20 abruptly reduces, an example in which the $\Delta V$ control is applied will be described, assuming a case where the accelerator pedal ON state is maintained for the period of time t20 to time t21 and the accelerator pedal is turned OFF at the timing of time t21.

At time t21 when the accelerator pedal is turned OFF, an operating load on the fuel cell stack 20 rapidly reduces, so that the controller 70 gradually decreases the electric power generation command value Pref so as to reduce the surplus electric power Ws corresponding to the difference between the electric power generation amount Pmes and the electric power generation command value Pref. Gradually reducing the electric power generation command value Pref means, in other words, to set electric power which is more than the electric power matching an operating load as the electric power generation command value. A technique for gradually reducing the electric power generation command value Pref within a range in which drivability is not affected when the accelerator pedal is turned OFF is the technique which is so-called easing an accelerator pedal. Easing the accelerator pedal causes the rotary torque of the traction motor 54 to gradually decrease, resulting in small surplus electric power Ws corresponding to the difference between the electric power generation command value Pref and the electric power generation amount Pmes.

Slightly increasing the output voltage Vfc by $\Delta Vfc=(V2'-V1)$ (provided $V1<V2'<V2$) during the period of time t21 to time t22 allows the surplus electric power Ws to be stored in the capacitor 29 in the fuel cell stack 20. Even if a time delay occurs in the operation of increasing the output voltage Vfc by the DC/DC converter 51, the voltage $\Delta Vfc$, which is an increase in voltage, for storing the small surplus electric power Ws is small, thus making it even easier to match the electric power to be supplied to the external load 56 of the fuel cell stack 20 (Pmes-Ws) with the electric power generation command value Pref.

Another example in which the $\Delta V$ control is applied will now be described.

When the operating load abruptly decreases as the driver switches the accelerator pedal ON to the accelerator pedal OFF, the controller 70 increases the output voltage Vfc of the fuel cell stack 20 and charges the capacitor 29 with the surplus electric power Ws, as described above. If the driver turns the accelerator pedal OFF and then immediately turns the accelerator pedal back ON again, the fuel cell stack 20 is required to promptly supply electric power that matches the electric power generation command value Pref to the external load 56. However, even if the amount of the reactant gas to be supplied to the fuel cell stack 20 is increased, there will be a time delay for the electric power matching the electric power generation command value Pref to be generated. Hence, in such a case, the output voltage Vfc of the fuel cell stack 20 is decreased by the $\Delta V$ control and the electric power is taken out of the capacitor 29, thereby allowing the required electric power to be promptly supplied to the external load 56.

Figure 8:
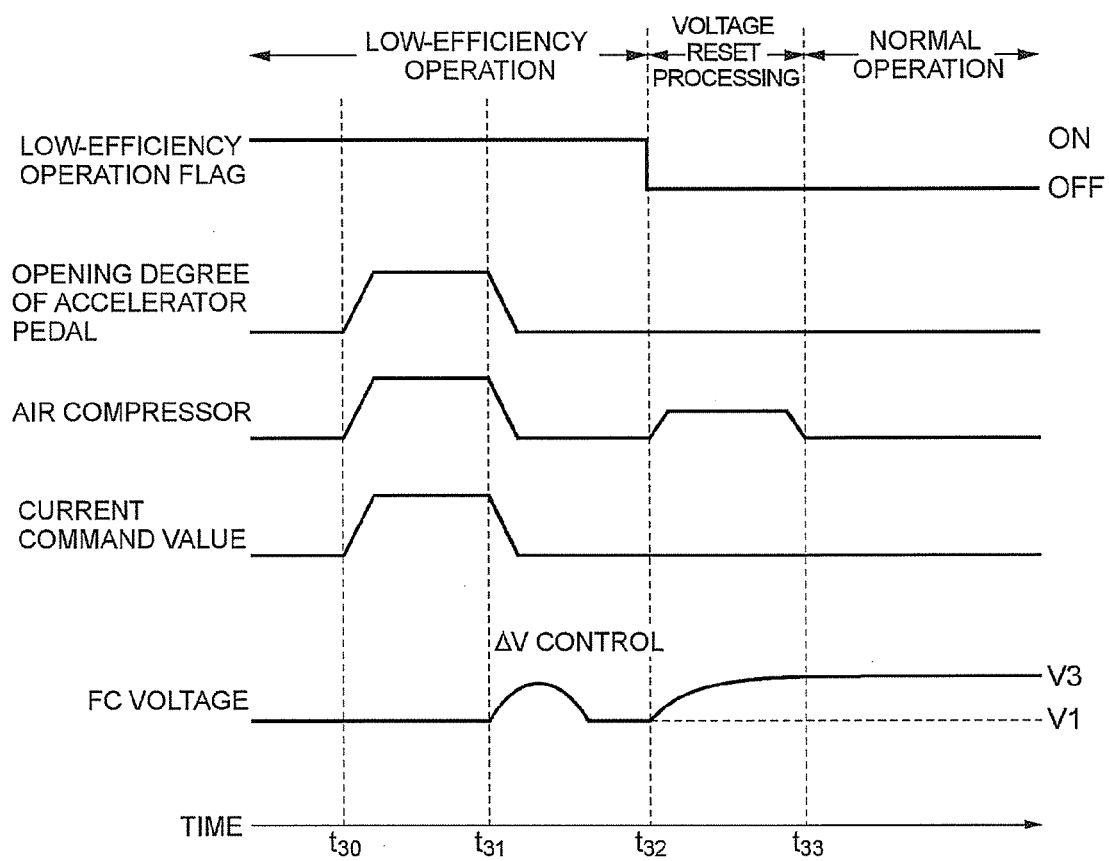
FIG. 8 is a timing chart illustrating a control process for switching from a low-efficiency operation to a normal operation.

Referring now to FIG. 8, the control process for changing the low-efficiency operation over to the normal operation will be described.

A low-efficiency operation flag provides flag information indicating whether the low-efficiency operation is being performed, and the low-efficiency operation flag is ON while the low-efficiency operation is being carried out, while the flag is OFF when the low-efficiency operation is not being carried out.

In a period before time t32, the controller 70 controls a cell operation by the low-efficiency operation and calculates a current command value based on the opening degree of the accelerator pedal to control the number of revolutions of the air compressor 32 such that an oxidizing gas matching the current command value is supplied to the fuel cell stack 20. For example, the accelerator pedal is turned ON at time t30, so that the controller 70 increases the current command value based on the opening degree of the accelerator pedal and then increases the number of revolutions of the air compressor 32 to catch up with the increased current command value. Then, the accelerator pedal is turned OFF at time t31, so that the controller 70 decreases the current command value based on the opening degree of the accelerator pedal and decreases the number of revolutions of the air compressor 32 to follow the decreased current command value.

At time t32 when the warm-up operation in the low-efficiency operation mode is completed, the low-efficiency operation flag switches from ON to OFF. This starts up a voltage reset processing routine, and during the period of time t32 to time t33, the voltage reset processing routine is implemented. In the voltage reset processing routine, the controller 70 drives the air compressor 32 at a number of revolutions that is larger than the number of revolutions of the air compressor 32 which matches a current command value corresponding to the opening degree of the accelerator pedal, thereby forcibly generating surplus electric power. For example, as illustrated in FIG. 8, the current command value is zero in the state of the accelerator pedal OFF, but the controller 70 drives the air compressor 32 at a number of revolutions that is slightly larger than the number of revolutions of the air compressor 32 that matches the zero current command value. The amount of the surplus electric power forcibly generated is preferably an amount required and adequate for moving the operating point OP1 of the fuel cell stack 20 by the ΔV control to the operating point OP3 on the I-V characteristic curve 200.

If the controller 70 detects that the power generation amount will be larger than the electric power generation command value (surplus electric power will be generated), then the controller 70 carries out the ΔV control to increase the output voltage Vfc of the fuel cell stack 20 from V1 to V3 to store the surplus electric power into the capacitor 29. Further, the controller 70 determines whether the difference between the electric power at the operating point specified by the target point in the ΔV control and the electric power at an actual operating point after the ΔV control has exceeded a predetermined threshold value thereby to determine whether the operating point of the fuel cell stack 20 has moved onto the I-V characteristic curve 200. Then, at time t33 when it is determined that the operating point of the fuel cell stack 20 has moved onto the I-V characteristic curve 200, the voltage reset processing is terminated and the operation mode is switched to the normal operation.

As is obvious from the above description, in order to switch the operation mode of the fuel cell system 10 from the low-efficiency operation to the normal operation, the operating point must be moved from a low-efficiency operation range to an operating point on the I-V characteristic curve 200 (the voltage value of the operating point must be increased). At this time, surplus electric power is forcibly created by supplying slightly excessive oxidizing gas to the fuel cell stack 20 so as to increase the output voltage Vfc of the fuel cell stack 20 to store the surplus electric power into the capacitor 29. Thus, the low-efficiency operation can be changed over to the normal operation without causing a change in the electric power supplied to the external load 56 of the fuel cell stack 20.

Figure 9:
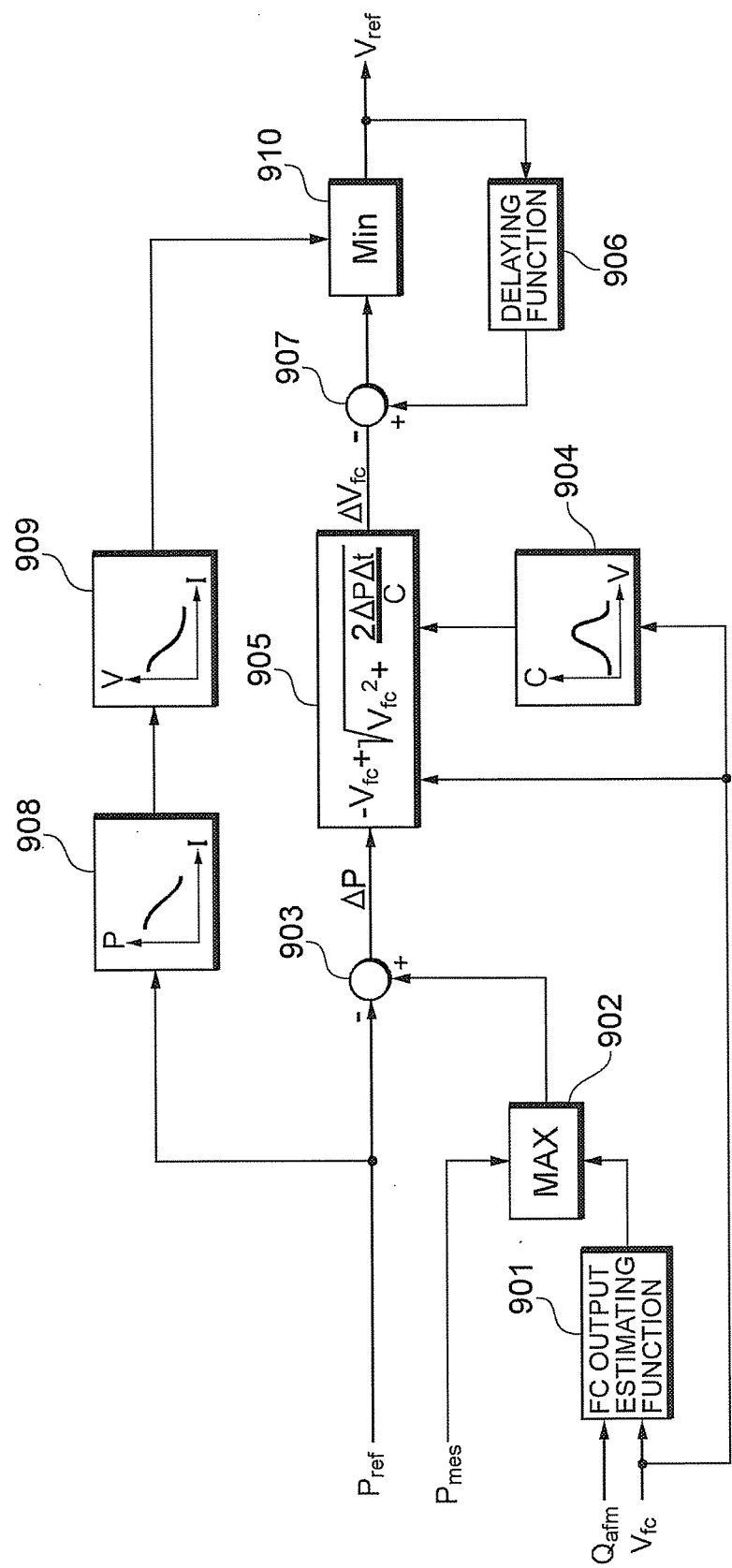
FIG. 9 is a functional block diagram for calculating a voltage command value of a fuel cell stack when the ΔV control is carried out.

FIG. 9 is a functional block diagram for calculating a voltage command value Vref of the fuel cell stack 20 during the ΔV control.

Functional blocks 901 to 910 illustrated in the drawing are implemented by an arithmetic function of the controller 70. An increased voltage ΔVfc per unit time is calculated from electric power ΔP stored in the capacitor 29 per unit time to determine the voltage command value Vref.

An FC output estimating function 901 calculates a theoretical electric power generation amount Pest according to a predetermined arithmetic expression on the basis of the flow rate of air Qafm supplied to the fuel cell stack 20 and the output voltage Vfc. A MAX function 902 compares the actual electric power generation amount Pmes of the fuel cell stack 20 with the theoretical electric power generation amount Pest, then outputs whichever of the two electric power values is larger as an output value. A subtracting function 903 subtracts an output value of the MAX function 902 from the electric power generation command value Pref to determine an electric power error ΔP.

Map data 904 holds the capacitance values of the capacitor 29. The capacitor 29 is a voltage-dependent variable-capacitance capacitor, so that the capacitance value thereof depends on the output voltage Vfc. Therefore, if the output voltage Vfc changes, then the capacitance value of the capacitor 29 changes accordingly. A ΔVfc calculating function 905 acquires ΔP from the subtracting function 903 and also acquires a capacitance value C of the capacitor 29 from the map data 904 to calculate an increase voltage ΔVfc according to $\Delta Vfc = -Vfc + sqr(Vfc^2 + 2\Delta P\Delta t/C)$. Here, Δt denotes a calculation cycle (sampling cycle), ΔP denotes the electric power stored in the capacitor 29 per unit time, and the function sqr denotes a function having a square root of an argument as an output value.

A delay function 906 stores the voltage command value Vref obtained at preceding sampling. A subtracting function 907 subtracts the ΔVfc calculated by the ΔVfc calculating function 905 from the voltage command value Vref obtained at the preceding sampling which has been stored in the delay function 906 (the sign of ΔVfc is negative, so that ΔVfc is actually added), thereby calculating the voltage command value.

A P-I map data 908 is map data indicating a theoretical correspondence relationship between the electric power and the current of the fuel cell stack 20. V-I map data 909 is map data indicating a theoretical correspondence relationship between the voltage and the current of the fuel cell stack 20. By referring to these map data 908 and 909, a theoretical voltage value corresponding to the electric power generation command value Pref (a voltage value on the I-V characteristic curve 200) can be obtained. A Min function 910 compares the voltage command value calculated via the ΔVfc calculating function 905 and the theoretical voltage value corresponding to the electric power generation command value Pref calculated via the aforesaid map data 908 and 909, and outputs whichever is smaller as the voltage command value Vref. The function of the Min function 910 corresponds to the processing for determining whether the operating point specified as a target point during the ΔV control has moved to an operating point on the I-V characteristic curve 200.

The controller 70 carries out the aforesaid calculation at every Δt while the ΔV control is being conducted and sequentially updates the voltage command value Vref.

Figure 10:
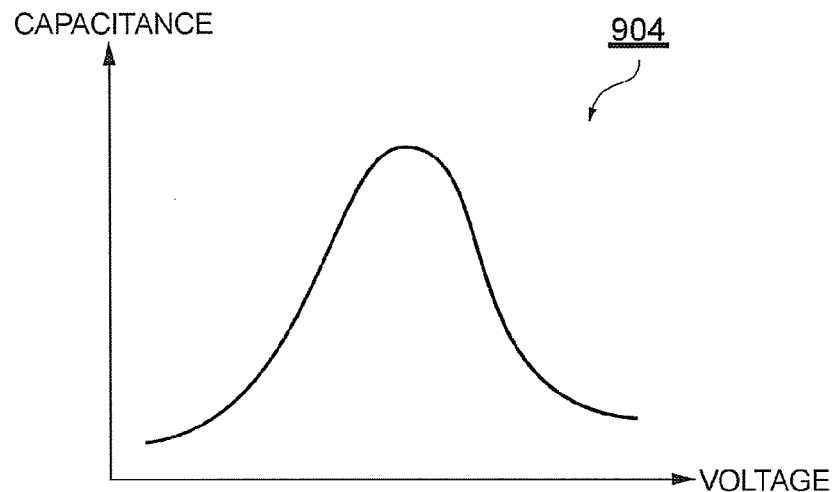
FIG. 10 is map data of a capacitive component which parasitically exists in the fuel cell stack.
Figure 11:
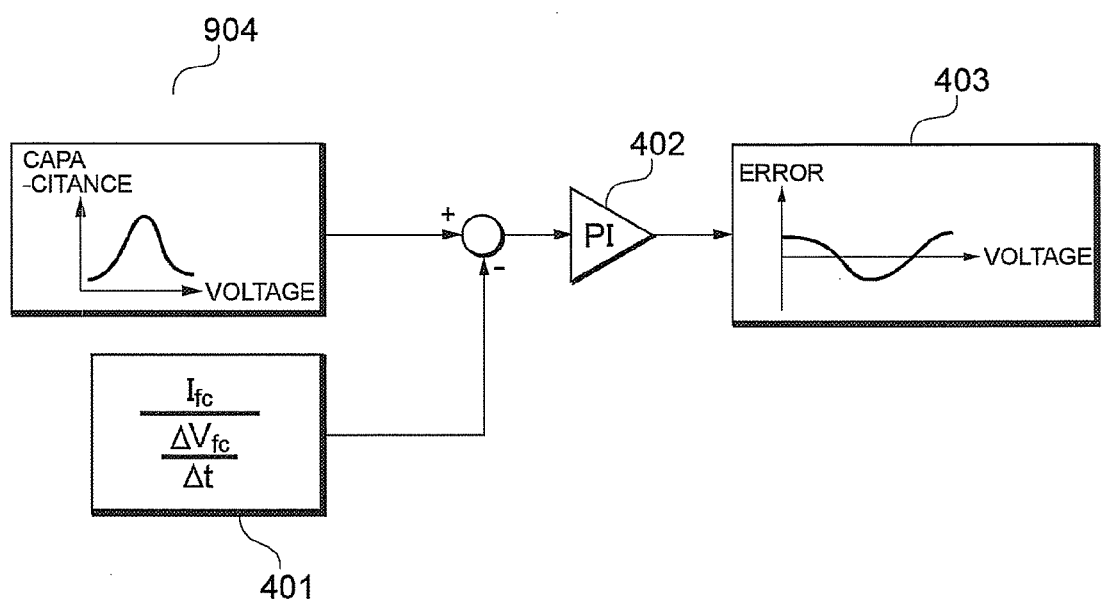
FIG. 11 is a block diagram for correcting the map data of a capacitive component which parasitically exists in the fuel cell stack.

Referring now to FIG. 10 to FIG. 11, the processing for correcting the map data 904 holding the capacitance values of the capacitor 29 will be described.

FIG. 10 illustrates the map data 904 holding the capacitance values of the capacitor 29. As described above, since the capacitor 29 is a voltage-dependent variable-capacitance capacitor, the capacitor 29 has a characteristic in which the capacitance value thereof depends on the output voltage Vfc and the capacitance value of the capacitor 29 changes according to the output voltage Vfc. If the fuel cell stack 20 is continued to be used over a prolonged time at an oxidation potential, then oxides adhere to the surfaces of the catalyst layers 23a and 24a, causing the C-V characteristic to deteriorate due to aging degradation. A change in the C-V characteristic of the fuel cell stack 20 means a change in the capacitance value of the capacitor 29 in the equivalent circuit illustrated in FIG. 4, so that it is necessary to correct the map data 904 according to a change in the C-V characteristic.

FIG. 11 illustrates a functional block diagram for correcting the map data 904 holding the capacitance values of the capacitor 29.

In the figure, a PI control function 402 is implemented by the arithmetic function of the controller 70.

The controller 70 reads the output voltage Vfc and the output current Ifc from the voltage sensor 71 and the current sensor 72, respectively, and calculates the value of Ifc/(ΔVfc/Δt) each time at every predetermined calculation cycle thereby to determine an actually measured capacitance value 401 of the capacitor 29 corresponding to the output voltage Vfc. The PI control function 402 reads the capacitance value of the capacitor 29 corresponding to the output voltage Vfc from the map data 904, and subjects the difference between the read capacitance value and the actually measured capacitance value 401 to PI control thereby to create error correction map data 403. An accurate capacitance value of the capacitor 29 can be determined by adding the capacitance value read from the map data 904 and a correction value read from the error correction map data 403.

When the aforesaid ΔVfc calculating function 905 reads a capacitance value of the capacitor 29 from the map data 904, a capacitance value corrected by the error correction map data 403 is desirably used.

According to the present embodiment, when an electric power generation command value abruptly reduces during the low-efficiency operation, the surplus electric power Ws exceeding the electric power generation command value Pref can be stored in the capacitor 29 parasitically existing in the fuel cell stack 20, thus making it possible to restrain the supply of surplus electric power from the fuel cell stack 20 to the external load 56.

Further, the present embodiment has the error correction map data 403 as a correcting means for correcting the map data 904 on the basis of the map data 904 indicating capacitance values relative to voltages of the capacitor 29 and the actually measured capacitance value 401 obtained by dividing the output current Ifc of the fuel cell stack 20 by a change per unit time of the output voltage Vfc of the fuel cell stack 20, thus making it possible to accurately store the surplus electric power Ws into the capacitor 29.

Moreover, according to the present embodiment, when an operating load on the fuel cell stack 20 suddenly reduces in the midst of the low-efficiency operation, the electric power generation command value Pref is gradually reduced so as to control the difference between the power generation amount Pmes of the fuel cell stack 20 and the electric power generation command value Pref. This arrangement makes it possible to minimize the surplus electric power Ws and to reduce the difference between the electric power generation amount supplied to the external load 56 of the fuel cell stack 20 (Pmes-Ws) and the electric power generation command value Pref.

Further, according to the present embodiment, in the case where an operating point specified to store the surplus electric power Ws in the capacitor 29 has a voltage value which is higher than the voltage value determined by the I-V characteristic curve 200 of the fuel cell stack 20 in the normal operation, it is determined that the operating point is out of the low-efficiency operation range, allowing the changeover from the low-efficiency operation to the normal operation to be accomplished.

Further, according to the present embodiment, when switching from the low-efficiency operation to the normal operation, more oxidizing gas than the oxidizing gas supply amount matching the electric power generation command value Pref is supplied to the fuel cell stack 20 so as to forcibly generate the surplus electric power Ws, and the output voltage Vfc of the fuel cell stack 20 is increased to store the surplus electric power Ws into the capacitor 29, thus making it possible to change the operation mode from the low-efficiency operation over to the normal operation without causing fluctuations in the electric power supplied to the external load 56 of the fuel cell stack 20.

In the aforesaid embodiment, an application example in which the fuel cell system 10 is used as a vehicle-mounted electric power source system has been described. However, the application of the fuel cell system 10 is not limited to the aforesaid example. For instance, the fuel cell system 10 may be mounted as an electric power source for a mobile body other than a fuel cell hybrid vehicle (a robot, a vessel, aircraft, or the like). Further, the fuel cell system 10 according to the present embodiment may be used as power generation equipment (a fixed power generation system) of a house, a building or the like.

INDUSTRIAL APPLICABILITY

According to the present invention, when an electric power generation command value suddenly reduces during a low-efficiency operation, surplus electric power exceeding the electric power generation command value can be stored into a capacitive component of a fuel cell, thus making it possible to restrain the supply of the surplus electric power from the fuel cell to an external load.

The invention claimed is:

1. A fuel cell system comprising:
    a fuel cell configured to receive a supply of a reactant gas to generate electric power;
    a warm-up device configured to warm up the fuel cell by a low-efficiency operation having lower power generation efficiency than that of a normal operation during which an operating point of the fuel cell is positioned on a current-to-voltage characteristic curve of the fuel cell; and
    a controller programmed to increase an output voltage of the fuel cell when an electric power generation command value for the fuel cell suddenly reduces in the midst of the low-efficiency operation and to store surplus electric power exceeding the electric power generation command value into a capacitive component of the fuel cell.

2. The fuel cell system according to claim 1, further comprising:
    map data indicating capacitance values relative to voltages of the capacitive component; and
    a correcting device configured to correct the map data on the basis of an actually measured value of the capacitive component obtained by dividing an output current of the fuel cell by a change per unit time of an output voltage of the fuel cell.

3. The fuel cell system according to claim 1, further comprising:
    an electric power generation command device configured to reduce the electric power generation command value such that a difference between an electric power generation amount of the fuel cell and the electric power generation command value is controlled when an operating load on the fuel cell is suddenly decreased in the midst of the low-efficiency operation.

4. The fuel cell system according to claim 1, wherein when an operating point specified to store the surplus electric power into the capacitive component has a voltage value which is higher than a voltage value determined by a current-to-voltage characteristic curve of the fuel cell in a normal operation, the controller is configured to switch an operation mode from the low-efficiency operation to the normal operation.

5. The fuel cell system according to claim 4, wherein at the time of switching from the low-efficiency operation to the normal operation, the controller is configured to forcibly generate the surplus electric power by supplying more reactant gas than a reactant gas supply amount which matches the electric power generation command value to the fuel cell and to increase an output voltage of the fuel cell so as to store the surplus electric power into the capacitive component.

6. The fuel cell system according to claim 1, wherein the low-efficiency operation is a cell operation at an operating point having a voltage value which is lower than a voltage value determined by a current-to-voltage characteristic curve of the fuel cell.

7. The fuel cell system according to claim 1, wherein the capacitive component is an apparent capacitive component attributable to an oxidation-reduction reaction between an electrical double layer capacitive component and a catalyst of a catalyst carrier of the fuel cell.

\* \* \* \* \*

UNITED STATES PATENT AND TRADEMARK OFFICE
CERTIFICATE OF CORRECTION

PATENT NO. : 8,460,835 B2  
APPLICATION NO. : 12/675709  
DATED : June 11, 2013  
INVENTOR(S) : Imanishi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 639 days.

Signed and Sealed this
Eighth Day of September, 2015

Michelle K. Lee
*Director of the United States Patent and Trademark Office*